United States Patent [19]

Haarbosch

[11] Patent Number: 4,475,649
[45] Date of Patent: Oct. 9, 1984

[54] STOWAGE CASE FOR AN ELECTRIC CORD

[75] Inventor: Willem R. Haarbosch, Eindhoven, Netherlands

[73] Assignee: U.S. Philips Corporation, New York, N.Y.

[21] Appl. No.: 454,410

[22] Filed: Dec. 29, 1982

[30] Foreign Application Priority Data

Jan. 8, 1982 [NL] Netherlands ........................ 8200052

[51] Int. Cl.³ .......................... B65D 85/00; N01B 7/00
[52] U.S. Cl. .................................... 206/328; 206/334; 150/55; 174/135
[58] Field of Search ..................... 206/328, 334, 45.14, 206/0.82; 150/52 R, 55; 174/135, 92, 138 F

[56] References Cited

U.S. PATENT DOCUMENTS

| 2,160,961 | 6/1939 | Dorman | 174/135 |
| 2,253,974 | 8/1941 | Guild | 206/45.14 |
| 2,582,787 | 1/1952 | Martin | 206/328 |
| 3,068,316 | 12/1962 | Witt | 174/135 |
| 3,089,210 | 5/1963 | Ritter | 174/135 |
| 3,198,196 | 8/1965 | Sawin | 220/339 |
| 3,337,682 | 8/1967 | Swett | 174/135 |

FOREIGN PATENT DOCUMENTS 595497 4/1960 Canada .......................... 206/0.82

Primary Examiner—William T. Dixson, Jr.
Attorney, Agent, or Firm—Joseph P. Abate

[57] ABSTRACT

A storage case for an electric cord includes means for permitting the insertion or removal of a cord. The case also includes a wall having at least one cord passage.

4 Claims, 9 Drawing Figures a b

STOWAGE CASE FOR AN ELECTRIC CORD

BACKGROUND OF THE INVENTION

The invention relates to a stowage case for an electric cord. Stowage cases for electric cords are known per se.

A problem associated with appliances provided with an electric power cord is that the distance between the power socket and the appliance is smaller than the length of the electric power cord. The excess length of cord generally hangs loosely from or lies behind or beside the appliance. This is inconvenient and, moreover, does not present a neat appearance.

It has been proposed to equip appliances with a device for automatically taking up the cord by means of a spiral spring. It has also been proposed to equip an appliance with a compartment in the bottom or in the rear wall for taking up the excess length of cord.

SUMMARY OF THE INVENTION

The object of the present invention is to provide another solution to this problem. To this end, the stowage case is characterized in that the case comprises means for permitting the insertion or removal of an electric cord (e.g. manually), at least one opening for the passage of the cord being formed in at least one wall of the case. The case may be formed with one opening for the passage of the cord to both cord ends or two openings each for the passage of the cord to one cord end. The case should be dimensioned such that the excess length of cord can readily be inserted into or removed from the case. Such cases can be manufactured very inexpensively.

A preferred embodiment of the stowage case is characterized in that the case comprises a shell including an elongate central member fixed to two opposed end members. The central and end members form a cord storage space between them; the longitudinal axis of the central member is oriented in a direction perpendicular to the end members. The central member forms an open slot having substantially constant dimensions and extending continuously from one end member to the opposed end member in a direction parallel to the longitudinal axis. At least one end member has a cord passage therethrough and also has a substantially V-shaped aperture which communicates with the passage and with the slot. This embodiment permits the excess length of cord to be inserted simply into the case through the slot, the cord being placed into the cord passages at the case ends. The shell may be a unitary part whose central member may have a curved outer surface.

Another embodiment of the stowage case is characterized in that the means comprises two case sections, one case section being slidable into the other case section, which case sections together constitute the case, at least one aperture being formed in at least one case section, which aperture, together with a wall portion of the other case section, forms the cord passage when the case is closed. In fact, this storage case is formed by a lower case section with a cover section. For inserting the cord, the cover section must be removed from the lower case section after which the excess length of cord, generally in folded or rolled-up condition, is inserted into the case section, the outgoing cord parts being placed into the apertures, after which the cover section is refitted.

Yet another embodiment of the stowage case is characterized in that the means comprises two case sections which are hinged relative to each other and together form the case, an aperture being formed in at least one case section, which aperture together with a wall portion of the other case section, forms the cord passage when the case is closed. The stowage case is in fact a lower case section or receptacle provided with a hinged cover, an aperture or apertures for the passage of the cord being formed in the case and/or the cover. The advantage of this stowage case in comparison with the stowage case described in the foregoing is that this stowage case comprises only one part and can be closed, while the stowage case in accordance with the first embodiment one aperture remains always open. Moreover, the two last-mentioned embodiments may be provided with a lock in order to ensure that the case sections remain in the closed position.

The stowage case in accordance with the invention is also very convenient for storing the power cord when the appliance is packed in its packaging box.

Embodiments of the invention will now be described in more detail, by way of example, with reference to the drawing.

DESCRIPTION OF THE PREFERRED EMBODIMENTS

Figure 1:
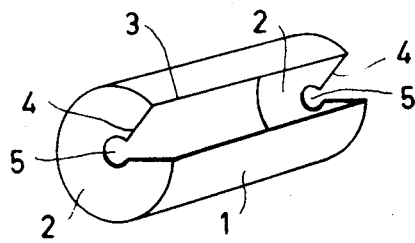
FIGS. 1-4 are perspective views of various embodiments of the present invention.

The stowage case shown in FIG. 1 comprises only one part in the form of a circumferential surface 1 with circular end surfaces 2. In the circumferential surface a slot 3 is formed over the entire length, which slot permits an electric power cord to be inserted in the folded or rolled-up condition. In the end surfaces 2, the slot changes into trough-shaped apertures 4 each of which terminates in a circular cord passage 5. When the excess length of cord is inserted, the outgoing cord parts are placed into the cord passages 5. If a greater length of cord is required it suffices to pull out one or both outgoing cord portions (not shown).

The stowage case shown in FIG. 2a comprises two case sections 6 and 7, the case section 7 being slidable onto the case section 6. In the opposite short end surfaces 8 and 9 of the two case sections, elongate apertures 10 and 11 are formed. If the sections are slid onto each other, cord passages 12 are formed (FIG. 2b).

Figure 2:
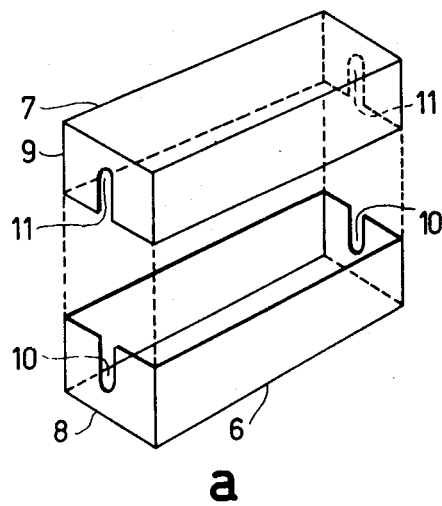
Figure 2:
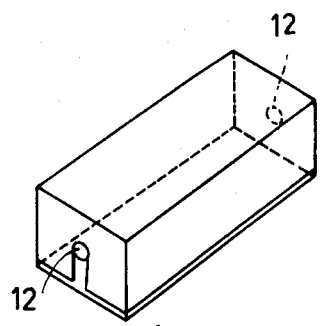
Figure 3:
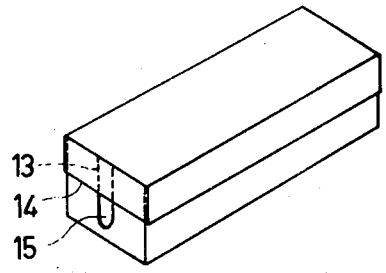

FIG. 3 shows a stowage case which is similar to that shown in FIG. 2, but now an aperture 13 is formed in only one end surface of one housing section. In the closed condition of the case, the aperture 13 together with the edge 14 of the other case section forms a cord passage 15 which is so large that both outgoing parts of the cord can pass through.

Figure 4:
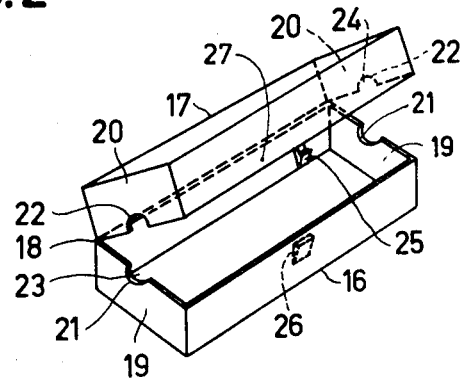

The stowage case shown in FIG. 4 comprises two case sections 16 and 17 which are interconnected by means of a hinge 18. In the opposite end surfaces 19, 20 of the two case sections, semicircular apertures 21 and 22 are formed. In the closed condition of the case, these apertures form substantially circular passages 23, 24 for the cord. The hinged stowage case may be provided with a lock. This lock may for example be a hook 25 on the case section 17, which hook engages behind an edge 26 of the case section 16. By pressing the side wall 27 of the case section 17 slightly inwards, the hook 25 is disengaged from the edge 26 and the case can be swung open. Such a hinged stowage case for an electric power cord can be manufactured integrally by injection-moulding from a plastics. The hinge is then an integral hinge.

FIGS. 5 to 8 show various embodiments of hinged stowage cases having different cord passages.

Figure 5:
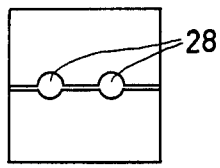
FIGS. 5-8 are end elevational views of hinged embodiments having various cord passages.

The stowage case shown in FIG. 5 has two separate cord passages 28 on one side only, which passages are formed by two semicircular apertures in each case section.

Figure 6:
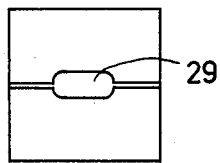

FIG. 6 shows a stowage case having only one cord passage 29 for the passage of both outgoing parts of the cord.

Figure 7:
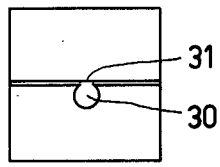

FIG. 7 shows a stowage case in which, in one of the case sections in two opposite side surfaces, an aperture 30 is formed, which apertures together with the edges 31 of the other case section, form the cord passages.

Figure 8:
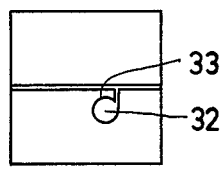

Finally, the stowage case shown in FIG. 8 also has two cord passages 32 in one of the case sections only. The outgoing part of the cord may then be placed into the aperture after slightly bending away a resilient tab 33.

Figure 9:
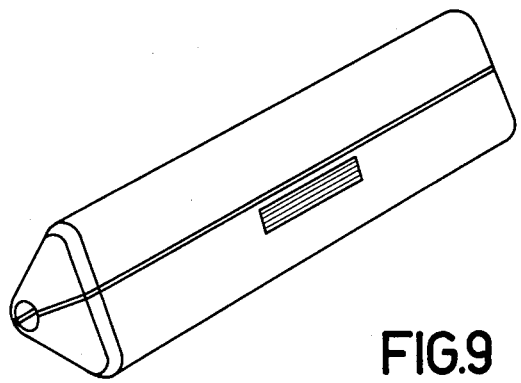
FIG. 9 is a perspective view of another hinged embodiment of the present invention.

It will be evident that the cord passages may have various shapes. FIGS. 2 to 8 show rectangular storage cases. It is obvious that, for example, cylindrical cases or elongate cases of triangular cross-section are equally possible (see FIG. 9).

What is claimed is:

1. A storage case for an electric cord, comprising: a shell including an elongate central member fixed to two opposed end members, the central and end members forming a cord storage space between them, the longitudinal axis of the central member being oriented in a direction perpendicular to the end members, the central member forming an open slot for the insertion or removal of a folded cord into or from the storage space, the slot having substantially constant dimensions and extending continuously from one end member to the opposed end member in a direction parallel to the longitudinal axis, at least one end member having a cord passage therethrough and also having a substantially V-shaped aperture communicating with the passage and with the slot.

2. A storage case as claimed in claim 1, wherein the shell is a unitary member.

3. A storage case as claimed in claim 1, wherein the central member has a curved outer surface.

4. A storage case as claimed in claim 1, wherein the end members are circular, and each end member has a respective cord passage therethrough and also has a respective substantially V-shaped aperture communicating with the passage and with the slot.

* * * * *